United States Patent [19]

Kobayashi et al.

[11] 4,242,699
[45] Dec. 30, 1980

[54] RECORDING AND REPRODUCING APPARATUS FOR COLOR VIDEO SIGNALS

[75] Inventors: Masaaki Kobayashi, Kawanishi; Kiyoji Fujisawa, Nara, both of Japan

[73] Assignee: Matsushita Electric Industrial Co., Ltd., Kadoma, Japan

[21] Appl. No.: 842,334

[22] Filed: Oct. 14, 1977

[30] Foreign Application Priority Data

Oct. 19, 1976 [JP] Japan ................................. 51-125758
Apr. 22, 1977 [JP] Japan ................................. 52-47156

[51] Int. Cl.³ ............................................. H04N 5/76
[52] U.S. Cl. ..................................................... 358/4
[58] Field of Search ................... 358/4, 8; 360/33, 18, 360/24

[56] References Cited

U.S. PATENT DOCUMENTS

| | | | |
|---|---|---|---|
| 3,715,468 | 2/1973 | Fujita | 358/4 |
| 3,730,983 | 5/1973 | Numakura et al. | 358/4 |
| 3,757,034 | 9/1973 | Fujita | 358/4 |
| 3,939,485 | 2/1976 | Amari et al. | 358/4 |
| 4,007,482 | 2/1977 | Amari | 358/4 |
| 4,007,484 | 2/1977 | Amari | 358/4 |
| 4,012,771 | 3/1977 | Ishigaki et al. | 358/4 |

OTHER PUBLICATIONS

*Color Television Standards:* Fink, McGraw-Hill, 1955, p. 57.

*Television Simplified:* Kiver & Kaufman, Van Nostrand Reinhold Company (1974 in Group), Figs. 21-29.
Encyclopedia of Science & Technology, vol. 3, McGraw-Hill, 1971, p. 317.

*Primary Examiner*—Raymond F. Cardillo, Jr.
*Assistant Examiner*—Aristotelis M. Psitos
*Attorney, Agent, or Firm*—Wenderoth, Lind & Ponack

[57] ABSTRACT

A recording and reproducing apparatus for color video signals, in which before the color video signal is recorded, the chroma signal of the color video signal is frequency-converted by a carrier from an oscillator whose frequency is $f_a = [(455/2) + \{(2n+1)/4\}]f_H$ so that the chroma signal is compressed to a very low frequency band with the sidebands of the chroma signal being interleaved with each other. The thus compressed signal is frequency-modulated and recorded, and is then reproduced and demodulated. The demodulated signal is balance-modulated and passed through a comb-filter to reproduce the chroma signal. Since the chroma signal is frequency-modulated before the recording, possible fluctuation of the signal level due to the recording and reproducing means does not affect the resulting reproduced chroma signal. Also, since the chroma signal is compressed to a very low frequency band, a time base error (jitters) which might possibly occur in the resulting reproduced chroma signal due e.g. to a fluctuation of the mechanical operation, such as magnetic tape movement, of the recording and reproducing means can be minimized.

3 Claims, 9 Drawing Figures

RECORDING AND REPRODUCING APPARATUS FOR COLOR VIDEO SIGNALS

This invention relates to a recording and reproducing apparatus for color video signals.

In a conventional recording and reproducing apparatus for color video signals, such as a color video tape recorder, the luminance signal in the color video signal is converted to a frequency-modulated signal which occupies a higher band in the band to be recorded, and the chroma signal in the color video signal is frequency-converted to occupy a lower band in the whole band to be recorded. These two converted signals from the luminance signal and the chroma signal are added and recorded on a recording medium such as magnetic tape. In reproducing, these converted and recorded signals are separately re-converted back to the luminance and the chroma signal.

However, the carrier from the oscillator for frequency-converting the chroma signal is selected to be outside the chroma signal band, and thus the chroma signal cannot be frequency-converted to a very low frequency band. Usually, the center frequency of the frequency-converted chroma signal is about 600 kHz or higher. Therefore, when the tape speed or the head rotational speed fluctuates, a considerable time base error (jitters) occurs in the re-converted or reproduced chroma signal. This means that the phase of the chroma signal fluctuates considerably, resulting in a disturbance of the color displayed on a television screen. An automatic phase control circuit which is rather complicated in the structure becomes necessary for suppressing this time base erroe in the chroma signal.

Further, in such a conventional apparatus, the fluctuation of the input-output signal level of the recording and reproducing means such as a tape-head system causes the frequency-converted signal of the chroma signal to fluctuate in signal level. An automatic gain control circuit becomes necessary for compensating this possible signal level fluctuation. The provision of such an automatic gain control circuit also causes the total apparatus to become complicated.

Accordingly, it is an object of this invention to provide a recording and reproducing apparatus for color video signals, in which the time base error and the signal level fluctuation in the chroma signal are minimized.

This object is achieved according to this invention by providing a recording and reproducing apparatus for color video signals, comprising: a band-pass filter for receiving a NTSC color video signal; a frequency converter coupled to the band-pass filter and supplied with a carrier from an oscillator for frequency-converting the chroma signal, the carrier having a frequency $f_a$ which is within the band of the chroma signal, and which is expressed by the equation $f_a = [(455/2) + (2n+1)/4]f_H$ where n is an arbitrary integer including zero, and $f_H$ is the line frequency of the NTSC color video signal; a frequency modulator coupled to the frequency converter for frequency-modulating the frequency-converted chroma signal; recording-reproducing means coupled to the frequency modulator for recording and reproducing the frequency-modulated chroma signal; a demodulator coupled to the recording-reproducing means for demodulating the reproduced frequency-modulated chroma signal; a balanced-modulator coupled to the demodulator and supplied with a carrier from an oscillator for frequency-converting the demodulated chroma signal, the carrier for the balanced-modulator having a frequency substantially equal to that of the carrier for the frequency converter; and a comb-filter coupled to the balanced-modulator for picking out from the thus frequency-modulated signal the signal corresponding to the original chroma signal.

According to this invention, because of the use of the unique carrier $f_a$, the frequency-converted chroma signal occupies a very low frequency band, near the zero frequency portion, and further the upper sidebands are interleaved with the lower sidebands in the frequency-converted chroma signal. The above equation for $f_a$ does not mean that $f_a$ should be exactly equal to $[(455/2)+(2n+1)/4]f_H$. A slight difference of $f_a$ therefrom may be allowed. Further, the definition that the carrier for the balanced-modulator has a frequency substantially equal to that of the carrier for the frequency converter does not mean that these two carriers should have exactly the same frequency. A slight frequency difference may be allowed.

The above described object and features and other objects and features of this invention will be apparent upon considering the following description taken together with the accompanying drawings, wherein.

Figure 2:
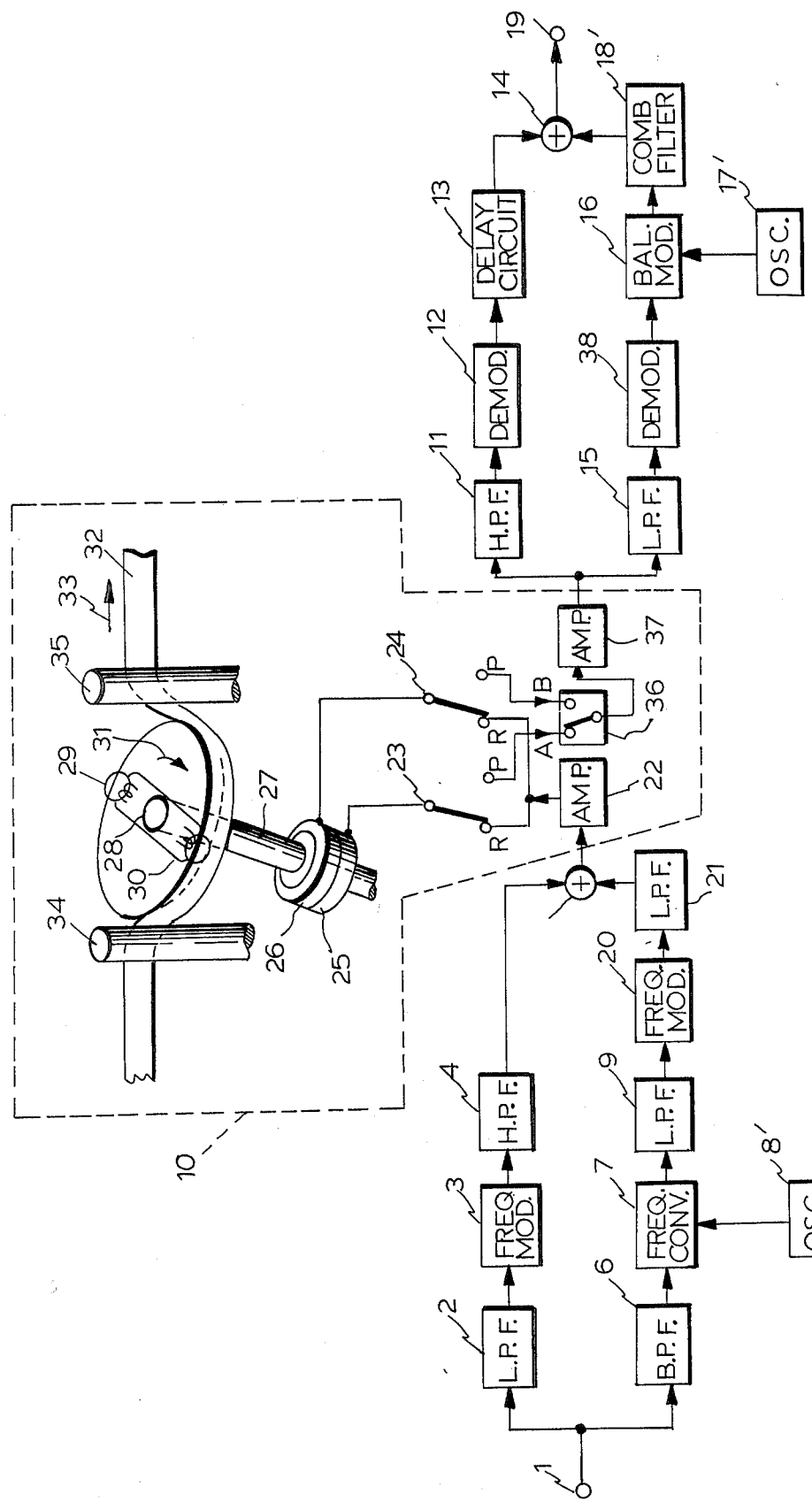
FIG. 2 is a block diagram showing a recording and reproducing apparatus constructed according to this invention.
Figure 4:
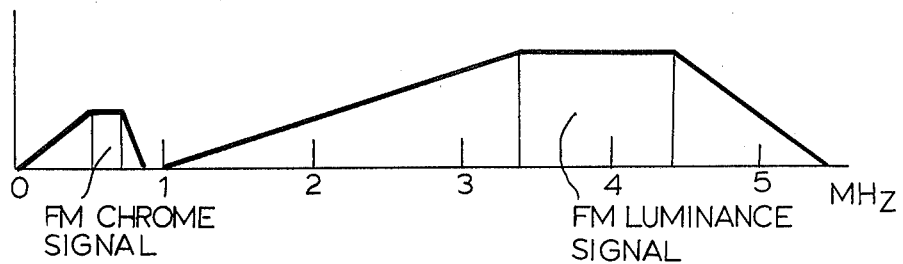
Figure 5:
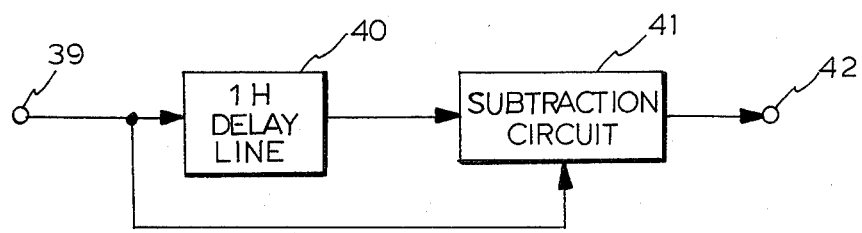
Figure 6:
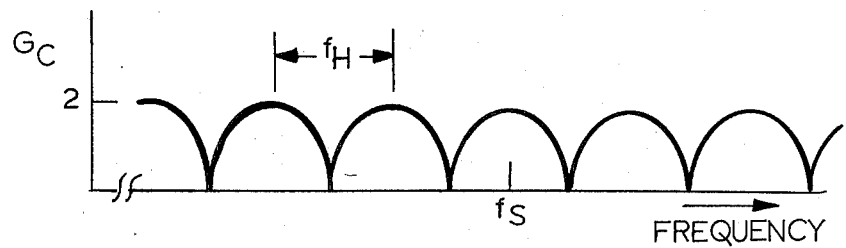

FIGS. 3(A) to 3(D) show frequency spectra of the chroma signal and the modified chroma signals appearing in the recording and reproducing apparatus of FIG. 2;

FIG. 4 is a frequency spectrum showing frequency allocation of the signals recorded in the apparatus of FIG. 2;

FIG. 5 is a block diagram of an example of the comb filter used in the apparatus of FIG. 2; and FIG. 6 is a graph showing the transfer function of the comb filter of FIG. 5.

In the drawings, like elements will be designated by like reference numerals. Before a preferred embodiment of this invention is described in detail, a conventional apparatus will be described below with reference to FIG. 1.

Figure 1:
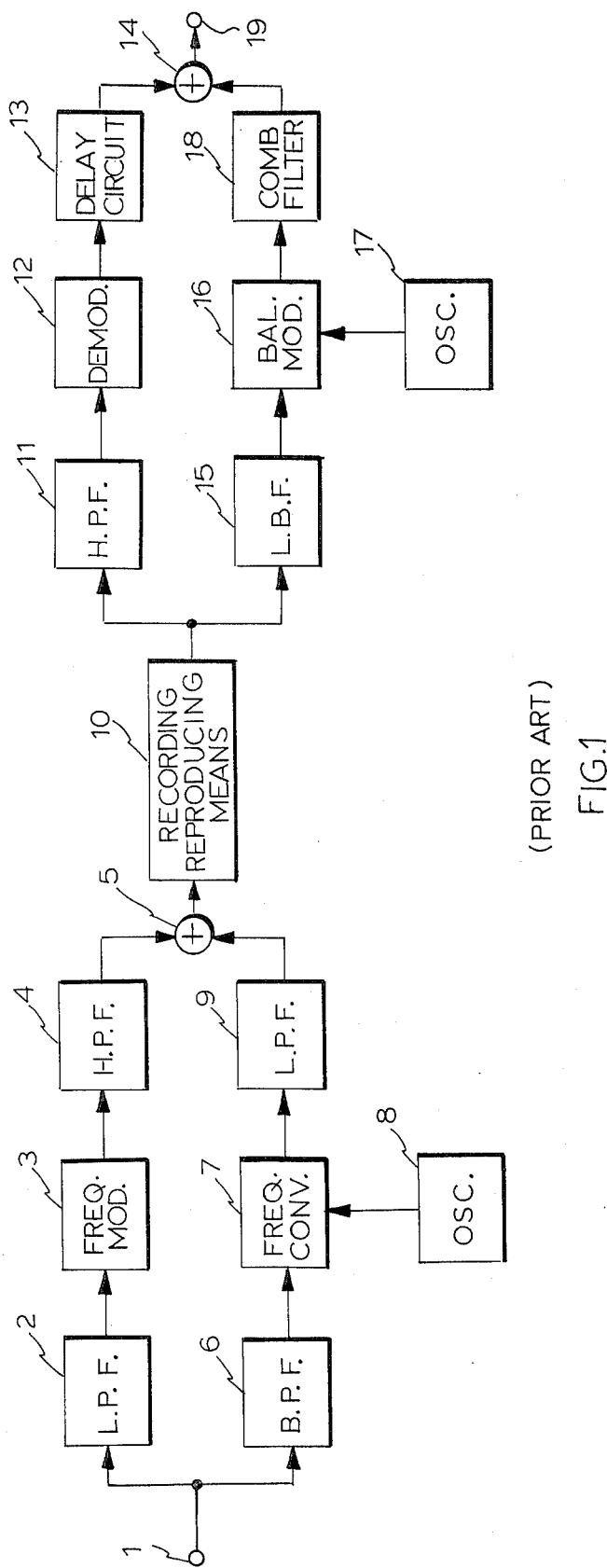
FIG. 1 is a block diagram of a conventional recording and reproducing apparatus for color video signals.

Referring to FIG. 1, a NTSC color video signal is applied to an input terminal 1. The luminance signal is separated out from the color video signal by a low pass filter 2 and is converted to a frequency-modulated luminance signals by a frequency modulator 3. The frequency-modulation deviation range is usually 3.4 MHz to 4.4 MHz. The frequency-modulated luminance signal is passed through a high pass filter 4 for removing lower frequency components in the FM luminance signal and is then applied to an adder 5.

Figure 3A:
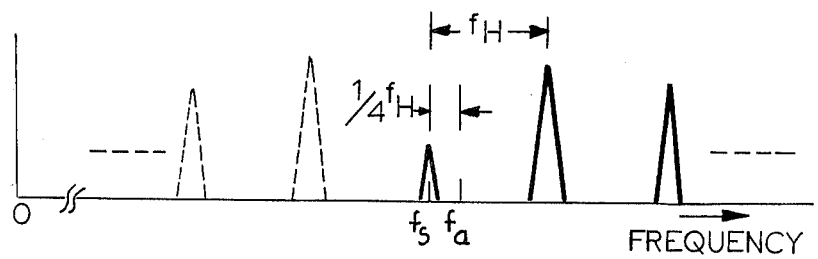

On the other hand, the chroma signal, as can be shown by FIG. 3(A) without the carrier $f_a$, is separated out from the color video signal by a band pass filter 6, and is then frequency-converted by a frequency converter 7, e.g. a balanced modulator or a mixer, supplied with a carrier from an oscillator 8. The carrier frequency is outside the chroma signal band, and usually, the center frequency of the frequency-converted chroma signal is about 600 kHz. The high frequency portion of the thus frequency-converted chrominance signal is removed by a low pass filter 9. The thus treated frequency-converted chrominance signal is applied to the adder 5.

The sum signal of the frequency-modulated luminance signal and the frequency-converted chroma signals is then recorded and reproduced by recording-reproducing means 10 such as a magnetic tape recording-reproducing means, an example of which is shown in FIG. 2. The reproduced signal is applied to a low pass filter 15 and a high pass filter 11. The frequency-converted chrominance signal in the reproduced signal is separated out by the low pass filter 15, and are then frequency-converted by a balanced-modulator 16 (preferably a double-balanced-modulator) supplied with a carrier from an oscillator 17 having a frequency substantially equal to that of the carrier frequency for the frequency converter 7. Spurious components in the output signal of the balanced-modulator 16 are removed by a comb filter so as to reproduce the original chroma signal. The thus reproduced chroma signal is applied to an adder 14.

On the other hand, the frequency-modulated luminance signal in the reproduced signal is separated out by the high pass filter 11 and is then demodulated by a demodulator 12 so as to reproduce the original luminance signal. The thus reproduced luminance signal is delayed by a delay circuit 13 to get to be in proper timing with the reproduced chroma signal, i.e. delayed in a manner so that the timing difference between the reproduced luminance signal and the reproduced chroma signal is the same as that between the original luminance signal and the original chroma signals. The thus delayed luminance signal is applied to the adder 14. In this way, the signals applied to the input terminal 1 are reproduced and appear at an output terminal 19.

A disadvantage of this type of conventional apparatus is that e.g. when the magnetic tape movement fluctuates, this causes a considerable time base error (jitter) in the resulting reproduced chroma signal. Another disadvantage is that when the input-output signal level of the recording-reproducing means fluctuates, this causes a considerable fluctuation in the signal level of the resulting reproduced chroma signal.

Now, a preferred embodiment of this invention will be described. Referring to FIG. 2, the luminance signal in the color video signal is treated in a manner similar to that illustrated in FIG. 1. On the other hand, the chroma signal is applied to the frequency converter 7 which is supplied with a carrier having a frequency of $f_a = [(445/2) + (2n+1)/4]f_H$ where n is an arbitrary integer including zero, $f_H$ is the line frequency, and where $f_a$ is within the chroma signal band from an oscillator 8', so that the frequency-converted signal becomes quite different from that in the conventional apparatus. Further, the frequency-converted signal is frequency-modulated by a frequency modulator 20.

How the chroma signal is treated in the apparatus of this invention will be described below with reference to FIGS. 2 to 6.

It is known that the chroma signal of a NTSC color video signal has a frequency spectra, as shown in FIG. 3(A), having $f_H$ frequency intervals around the subcarrier $f_s$ whose frequency is $(445/2)f_H$. For the convenience' sake, FIG. 3(A) illustrates only the subcarrier $f_s$, and the 1st and the 2nd upper sidebands, wherein the lower sidebands of the chroma signal is shown by dotted lines for the sake of easier understanding.

According to this invention, the frequency $f_a$ of the frequency conversion carrier from the oscillator 8' is selected to be within the chroma signal band and can be expressed by the following equation:

$$f_a = \left(\frac{455}{2} + \frac{2n+1}{4}\right)f_H,$$

where n is an arbitrary integer including zero, and $f_h$ is the line frequency. For example, the carrier frequency $f_a$ of the oscillator 8' may be selected to be:

$$f_a = \left(\frac{455}{2} + \frac{1}{4}\right)f_H$$

Figure 3B:
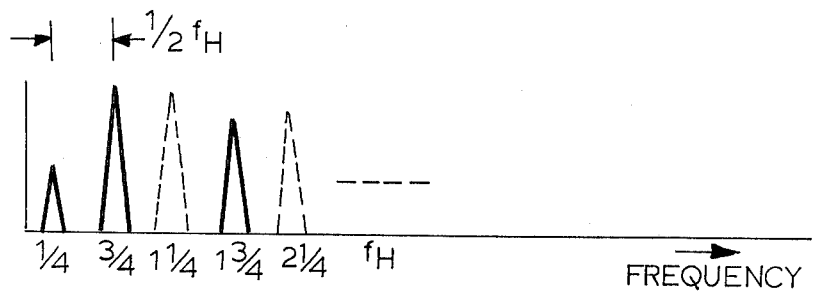

By using this carrier frequency $f_a$, the chroma signal is compressed to a very low frequency band as shown in FIG. 3(B). That is, as shown in FIG. 3(B), the differential frequency components of the chroma spectra and the carrier, including the lower sideband spectra overlapping zero frequency, are positioned in a row having $(\frac{1}{2})f_H$ frequency intervals with the upper and lower sidebands being interleaved with each other. More specifically, the subcarrier $(f_s)$ is converted down to $(\frac{1}{4})f_H$, the 1st upper sideband is converted down to $(\frac{3}{4})f_H$, the 1st lower sideband is converted down to $1(\frac{1}{4})f_H$, the 2nd upper sideband is converted down to $1(\frac{3}{4})f_H$, and the 2nd lower sideband is converted down to $2(\frac{3}{4})f_H$.

In a word, the bandwidth of chroma signal is reduced to nearly one half of the original bandwidth, and the chroma signal is converted down to a very low band or to near the zero frequency portion, with the sidebands of the chroma signal being interleaved with each other. Since the characterizing feature of the apparatus of this invention is to interleave the sidebands of the chroma signal to reduce the bandwidth of the chroma signal and to bring the chroma signal band close to zero frequency, it is apparent that $f_a$ is not necessarily exactly $[(445/2) + (2n+1)/4]f_H$. A slight frequency value difference may be allowed, if the above characterizing feature is satisfied.

The spurious high frequency components in the frequency-converted chroma signal are removed by the low pass filter 9. According to this invention, the output signal from the low pass filter 9, i.e. the sideband-interleaved chroma signals as shown in FIG. 3(B) are applied to a frequency modulator 20. This frequency modulator 20 frequency-modulates the sideband-interleaved chroma signals into a frequency-modulated chroma signal whose deviation range of frequency modulation is from 500 kHz to 700 kHz, for example.

Next, the upper sidebands of the frequency-modulated chroma signal are substantially removed by a low pass filter 21 to reduce the bandwidth. Thus, at the output of the low pass filter 21, a frequency-modulated sideband-interleaved chroma signal is obtained. This frequency-modulated sideband-interleaved chroma signal and the frequency-modulated luminance signal from the high pass filter 4 are added by the adder 5, and the thus added signals are applied to a recording-reproducing means 10 which is constituted by conventional video heads and conventional video tapes and so on.

The conventional recording-reproducing means 10 shown in FIG. 2 is constructed as follows.

The added signals from the adder 5 are applied to an amplifier 22. The amplifier 22 amplifies the signal as a recording signal, and supplies the recording signal to a pole R of each of the double throw switches 23 and 24. A frequency allocation of the recording signal is shown in FIG. 4. The arm of each of the switches 23 and 24 makes contact with the corresponding pole R, and the recording signal is applied to the outer side of each of rotary transformers 25 and 26. The inner side of each of the rotary transformer 25 and 26 is connected to each of video heads 29 and 30 through a shaft 27 and a rotary head bar 28.

A magnetic tape 32 is helically wrapped part of the way around a cylindrical drum on the periphery of which the video heads 29 and 30 are provided, and the tape moves in a direction shown by an arrow 33, guided by guide poles 34 ad 35. The two video heads 29 and 30 are located at opposite ends of the rotary head bar 28 affixed to the end of a shaft 27 driven by a motor (not shown in FIG. 2). Thus, the recording signal is recorded by the video heads 29 and 30 scanning the tape 32. A further arrow 31 shows the scanning direction of the video heads 29 and 30.

Upon playback, the heads 29 and 30 scan the recorded signal on the tape 32 and reproduce the recorded signal. The rotary transformers 25 and 26 connect the video heads 29 and 30 to the corresponding arms of the switches 23 and 24. Upon playback, because the arms of the switches 23 and 24 make contact with the corresponding poles P, the reproduced signal is applied to a pole A and a pole B of the switch 36. An arm of the switch 36 selects one of the poles A and B in accordance with alternate frames. As a result, the reproduced signal is converted into a successive signal. The thus converted signal is amplified by an amplifier 37, and is applied to the low pass filter 15 and the high pass filter 11 as in the conventional apparatus.

In the apparatus of FIG. 2, however, the low pass filter 15 separates out the frequency-modulated sideband-interleaved chroma signal, and there is provided a demodulator 38 coupled to the low pass filter 15 for demodulating the frequency-modulated chroma signal. The demodulated sideband-interleaved chroma signal is then frequency-converted (up-converted) by the balanced-modulator 16 supplied with a carrier from an oscillator 17', the frequency of which is substantially equal to the frequency of the oscillator 8' for frequency-conversion at the frequency converter 7 (down-conversion). The frequency of the carrier from the oscillator 17' is not necessarily exactly the same as that from the oscillator 8'. A slight frequency difference may be allowed for similar reasons to those as set forth above in connection with the oscillator 8'.

Figure 3C:
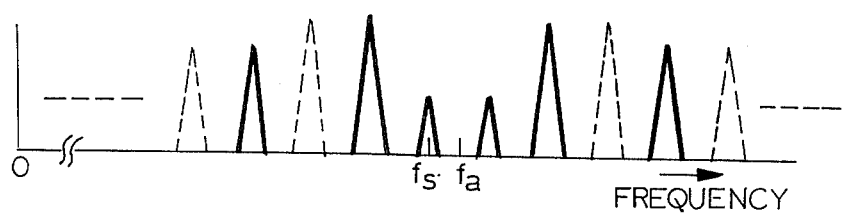
Figure 3D:
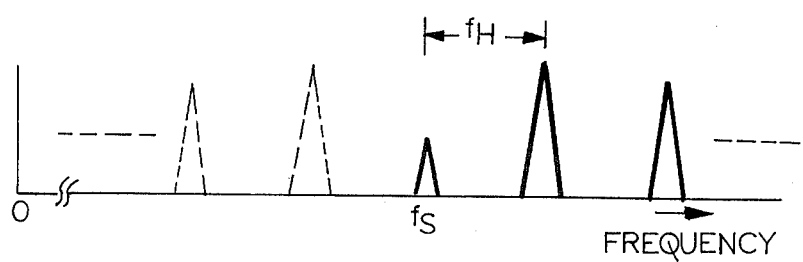

Then, there is provided a comb filter 18' coupled to the balanced-modulator 16 for picking out, from the output signals of the balanced-modulator 16 (up-converted signals), the signals as of FIG. 3(D) which correspond to the original chroma sideband signals. An example of the comb filter 18' is shown in FIG. 5 which comprises a 1 H delay line 40 (the delay time being 63.556 μsec) receiving the input signals at an input terminal 39 thereof and a subtraction circuit 41 receiving both the output signal from the delay line 40 and the input signal to the input terminal 39 to produce an output signal similar to that of FIG. 3(D) at an output terminal 42 thereof to be supplied to the adder 14. FIG. 3(D) shows the frequency response of the comb filter, passing frequencies near $f_s + Kf_H$ and to substantially block frequencies near $f \pm K\frac{1}{2})f_H$.

Thus, the transfer function $G_c$ of the comb filter 18' can be expressed by the following equation:

$$G_c = 2|\sin(\pi \cdot f_{in}/f_H)|$$

where $f_{in}$ is the input signal frequency to the comb filter 18', and $f_H$ is the line frequency. The transfer function $G_c$ can be plotted as in FIG. 6. Since the subcarrier $f_s$ in a NTSC color video signal has a frequency $(455/2)f_H$, the transfer function has a value of 2 when the input signal to the comb filter 18' has a frequency of $f_s$, resulting in the peak value of the curve of FIG. 6. The interval between adjacent peaks in the curve of FIG. 6 is $f_H$. The comb filter 18' has such properties. Therefore, when the sideband-interleaved signal such as illustrated by FIG. 3(C) are applied to the comb filter 18', the output signals of the comb filter 18' becomes the signal illustrated in FIG. 3(D).

On the other hand, the frequency-modulated luminance signal is separated out by the high pass filter 11 and passed through the demodulator 12 and the delay circuit 13, and is applied to the adder 14 together with the output signal of the comb filter 18'. The output signals of the adder 14 appear at the output terminal 19 of the apparatus.

Due to the use of the frequency modulation by the frequency modulator 20 and the demodulation by the demodulator 38, possible fluctuations of the signal level due to the recording and reproducing means does not affect the resulting chroma signal reproduced by the balanced-modulator 16. In other words, if the chroma signal is not frequency-modulated, as the S/N ratio of the recording and reproducing means decreases, the S/N ratio of the resulting reproduced chroma signal also decreases. In general, the S/N ratio of the recording and reproducing means is relatively low in a low frequency band.

Further, due to the use of the carrier $f_a$ for the frequency conversion by the frequency converter 7, the chroma signal is converted to a very low frequency band. Therefore, a time base error called jitter which might possibly occur in the chroma signal due to fluctuation of the magnetic tape speed has very little effect upon the resulting reproduced chroma signal.

In the above described embodiment, the luminance signal is assumed to be absent in the output signals of the band pass filter 6. However, there may be present high frequency components of the luminance signal, as cross color components, in the output signal of the band pass filter 6. If cross color components are present, it is known that they are present in an interleaving relation with the chroma signal. Therefore, by the frequency conversion by the frequency converter 7 of FIG. 2, the cross color components are likely to be converted to the same frequencies as the sideband interleaved chroma signal. That is, each frequency-converted cross-color component is likely to overlap, as to the frequency, each frequency-converter chroma signal component.

If it is necessary to avoid the presence of such cross color components in the sideband-interleaved chroma signal, these cross color components can be suppressed e.g. by providing a cross color suppressing circuit coupled to the frequency converter 7. For example, such cross color components can be suppressed by providing a comb filter like the comb filter 18' between the band pass filter 6 and the frequency converter 7.

While particular embodiments of the invention have been shown and described, it will be obvious to those skilled in the art that changes and modifications may be made without departing from the invention in its broader aspects and, therefore, the definition in the appended claims is to cover all such changes and modifications as fall within the true spirit and scope of the invention.

What is claimed is:

1. A recording and reproducing apparatus for color video signals comprising:
   a band pass filter, having an input for receiving a NTSC color video signal, having a frequency pass band for separating the chroma signal from a received NTSC color video signal;
   a first oscillator for producing a first carrier signal having a frequency $f_a$ which is within the bandwidth of said chroma signal and which may be expressed by the equation $$f_a = f_s - n/4 f_H,$$

where n is a predetermined odd integer, $f_s$ is the center frequency of said chroma signal, and $f_H$ is the line frequency of said received NTSC color video signal;
   a frequency converter coupled to said band pass filter and said first oscillator for producing a frequency converted chroma signal having a carrier frequency equal to the algebraic sum of $f_s$ and $f_a$ which is nearest zero, whereby the upper and lower sidebands of said chroma signal are interleaved in said frequency converted chroma signal by folding of said chroma signal at zero frequency;
   a frequency modulator coupled to said frequency converter for frequency modulating said frequency converted chroma signal;
   a recording-reproducing means coupled to said frequency modulator for recording and reproducing said frequency modulated chroma signal;
   a demodulator coupled to said recording-reproducing apparatus for demodulating said reproduced frequency modulated chroma signal;
   a second oscillator for producing a second carrier signal having a frequency $f_a$;
   a balanced-modulator coupled to said demodulator and said second oscillator for modulating said second carrier signal with said demodulated chroma signal, whereby said demodulated chroma signal is frequency converted to an interleaved chroma signal having a band centered about a frequency $f_s$; and
   a comb filter coupled to said balanced-modulator, having a frequency response to pass frequencies near $f_s \pm K f_H$ and to substantially block frequencies near $f_s \pm (K + \frac{1}{2}) f_H$, where K is an arbituary integer including zero, for filtering said interleaved chroma signal and obtaining a chroma signal substantially equal to the original chroma signal.

2. A recording and reproducing apparatus as claimed in claim 1, wherein said balanced-modulator is a double-balanced-modulator.

3. A recording and reproducing apparatus as claimed in claim 1, wherein said comb filter comprises a 1 H delay line receiving an input signal thereto and a subtraction circuit receiving both the input signal to said 1 H delay line and an output signal from said 1 H delay line.

* * * * *